(12) United States Patent
Kanai et al.

(10) Patent No.: US 6,278,494 B1
(45) Date of Patent: Aug. 21, 2001

(54) EDGE EMPHASIS DEVICE, IMAGE FORMING APPARATUS USING THE SAME, IMAGE SIGNAL PROCESSING METHOD, AND IMAGE FORMING METHOD USING THE SAME

(75) Inventors: Izumi Kanai, Sagamihara; Yukio Masuda, Atsugi; Kohei Inamura, Sagamihara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,357

(22) Filed: Feb. 23, 2000

(30) Foreign Application Priority Data

Feb. 24, 1999 (JP) ................................. 11-047186
Feb. 7, 2000 (JP) ................................. 12-029483

(51) Int. Cl.[7] ................................................... H04N 5/21
(52) U.S. Cl. ........................ 348/625; 348/606; 348/627; 382/266; 382/263
(58) Field of Search ..................... 348/625, 606, 348/627, 628; 382/266, 267, 268, 269, 263

(56) References Cited

U.S. PATENT DOCUMENTS

| | | | |
|---|---|---|---|
| 5,130,820 | * | 7/1992 | Hirota .................................. 358/447 |
| 5,321,511 | * | 6/1994 | Min ...................................... 348/625 |
| 5,801,791 | * | 9/1998 | Yamazaki et al. .................... 348/629 |
| 5,898,464 | * | 4/1999 | Cho ...................................... 348/625 |
| 5,959,693 | * | 9/1999 | Wu et al. .............................. 348/624 |
| 6,094,205 | * | 7/2000 | Jaspers ................................. 348/631 |
| 6,188,444 | * | 2/2001 | Webb ................................... 348/625 |
| 6,192,152 | * | 2/2001 | Funada et al. ....................... 382/263 |

OTHER PUBLICATIONS

U.S. application No: 09/507,942, Feb. 22, 2000.*

* cited by examiner

Primary Examiner—Reinhard J. Eisenzopf
Assistant Examiner—Trang U. Tran
(74) Attorney, Agent, or Firm—Fitzpatrick, Cella, Harper & Scinto

(57) ABSTRACT

This invention suppresses overshoot and undershoot at an edge of a video signal. For this purpose, an edge emphasis device which includes a first delay unit for delaying an input signal (s1) a predetermined time, a second delay unit for further delaying an output signal (s2) from the first delay unit a predetermined time, and a second derivative signal generation unit for outputting a second derivative signal (s5) of the input signal on the basis of the input signal (s1) and the output signals (s2,s3) from the first and second delay units, has an edge-emphasizing signal generation unit (10, 11, 13–17, 19) for generating an edge-emphasizing signal (s15) by assigning the sign (s9) of the second derivative signal to the minimum absolute value of the difference (s10) between the input signal and the output signal from the first delay unit, the difference (s11) between the output signals from the first and second delay units, and the second derivative signal (s5), and a delay addition unit (3, 20) for outputting a signal obtained by emphasizing an edge of the input signal by adding the edge-emphasizing signal and input signal by matching their delay times.

14 Claims, 6 Drawing Sheets

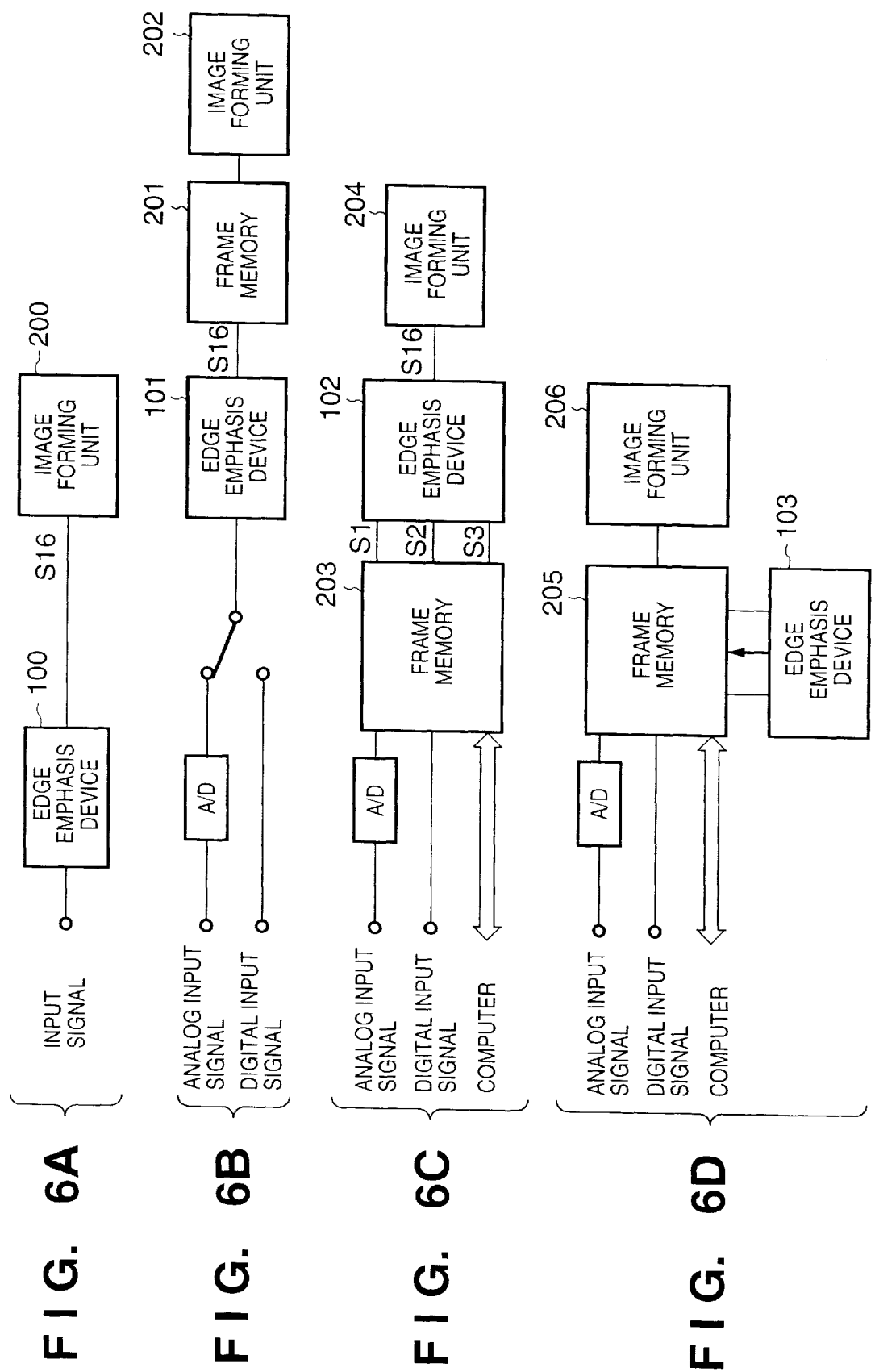

EDGE EMPHASIS DEVICE, IMAGE FORMING APPARATUS USING THE SAME, IMAGE SIGNAL PROCESSING METHOD, AND IMAGE FORMING METHOD USING THE SAME

FIELD OF THE INVENTION

The present invention relates to a device and method for emphasizing an edge of a video signal and, more particularly, to a device which can prevent deterioration of image quality by suppressing overshoot and undershoot.

BACKGROUND OF THE INVENTION

Sharpness is one important factor that determines image quality. An edge emphasis circuit is used to improve the sharpness. FIG. 4 is a circuit diagram for explaining a conventional edge emphasis circuit. Referring to FIG. 4, reference numeral 1001 denotes a video input terminal; 1002 and 1003, delay circuits connected in series to the video input terminal 1001 in the order named; 1004, 1005, and 1006, multipliers respectively connected to the video input terminal 1001, and the outputs of the delay circuits 1002 and 1003; 1007, an adder for adding the outputs from the multipliers 1004 to 1006; 1008, a multiplier connected to the output of the adder 1007; 1009, an adder for adding the outputs from the multiplier 1008 and delay circuit 1003; and 1010, a video output terminal connected to the output of the adder 1009. Also, reference numerals s1 to s6 denote signals at respective circuits. FIG. 5 shows the waveforms of these signals.

In this arrangement, a video signal s1 input from the video input terminal 1001 is input to the multiplier 1004 and first delay circuit 1002. The first delay circuit 1002 delays the input signal one pixel, and outputs a signal s2. The signal s2 is input to the multiplier 1005, second delay circuit 1003, and adder 1009. The signal s2 input to the second delay circuit 1003 is further delayed one pixel, and is output as a signal s3. The waveforms of these three signals s1, s2, and s3 are as shown in FIG. 5. That is, these signals are delayed one pixel each.

These signals s1, s2, and s3 are respectively input to the multipliers 1004, 1005, and 1006, and are respectively multiplied by ½, 1, and ½. The signs of the signals s1 and s3 are inverted, and the inverted signals s1 and s3, and non-inverted signal s2 are input to the adder 1007. The adder 1007 adds these signals, and outputs a sum signal s4. That is, the signal s4 assumes a value obtained by subtracting the average value of the previous and next image data from an image data value at a given point, i.e., a second derivative value at that point. The waveform of the signal s4 is as shown in FIG. 5.

Furthermore, the multiplier 1008 amplifies the signal s4 to obtain a signal s5. The signal s5 is an edge-emphasizing signal. The adder 1009 adds the signal s2 output from the delay circuit 1002 to the edge-emphasizing signal s5, thus generating an edge-emphasized video signal s6. In FIG. 5, the edge-emphasized signal s6 is indicated by the solid curve, and the original signal s2 is indicated by the broken curve to overlap the signal s6.

However, in the conventional edge emphasis circuit described above, the leading edge of an edge portion of the signal can be improved, while overshot and undershot portions are produced, as shown in FIG. 5. If such overshoot and undershoot are considerable, the image quality deteriorates due to a fringe formed at the boundary. When the coefficient of the multiplier 1008 is decreased to eliminate such overshoot and undershoot, the edge emphasis amount decreases in turn, and the improvement effect of the leading edge of the edge portion becomes small.

As described above, in the conventional edge emphasis circuit, the leading or trailing edge of the edge portion can be improved to obtain a sufficient edge emphasis effect, while considerable overshoot and undershoot result in deterioration of image quality.

SUMMARY OF THE INVENTION

The present invention has been made in consideration of the above situation, and has as its object to suppress the aforementioned overshoot and undershoot while maintaining the improvement effect of the leading edge of an edge portion.

In order to achieve the above object, an edge emphasis device according to the first aspect of the present invention is an edge emphasis device which comprises first delay means for delaying an input signal a predetermined time, second delay means for further delaying an output signal from the first delay means a predetermined time, and second derivative signal generation means for outputting a second derivative signal of the input signal on the basis of the input signal and the output signals from the first and second delay means, characterized by comprising edge-emphasizing signal generation means for generating an edge-emphasizing signal by assigning a sign of the second derivative signal to a minimum absolute value of a difference between the input signal and the output signal from the first delay means, a difference between the output signals from the first and second delay means, and the second derivative signal, and delay addition means for outputting a signal obtained by emphasizing an edge of the input signal by adding the input signal and a corresponding edge-emphasizing signal in correspondence with each other.

According to this aspect, since the aforementioned edge-emphasizing signal generation means is provided, and an input signal is emphasized by an edge-emphasizing signal generated by that means, overshoot or undershoot produced upon emphasizing the input signal by directly adding a second derivative signal thereto can be suppressed.

An edge emphasis device according to the second aspect of the present invention is an edge emphasis device for emphasizing an edge of an image signal, characterized by comprising a second derivative signal generation circuit for outputting a second derivative signal of a target signal on the basis of a target signal, a lead signal that leads ahead of the target signal a predetermined time, and a lag signal that lags behind the target signal a predetermined time, and an edge-emphasizing signal generation circuit for generating an edge-emphasizing signal by assigning a sign of the second derivative signal to a minimum value of an absolute value of a difference between the target signal and the lead signal, an absolute value of a difference between the target signal and the lag signal, and an absolute value of the second derivative signal.

Note that the second derivative signal can use a signal obtained by subtracting the average value of the lead and lag signals from the target signal. Also, the predetermined time the lead signal leads ahead of the target signal is preferably equal to the predetermined time the lag signal lags behind the target signal. Furthermore, the predetermined time the lead signal leads ahead of the target signal and/or the predetermined time the lag signal lags behind the target signal is preferably equal to the interval between signals corresponding to neighboring pixels in the input signal upon image formation.

The respective circuits can have various patterns. Also, the respective circuits may be integrated to build an integrated circuit. When the lead signal, target signal, and lag signal are digital signals, the aforementioned functions may be implemented by a microprocessor.

In this aspect, the edge-emphasizing signal becomes the one corresponding to the target signal. Therefore, a circuit for generating an edge-emphasized signal using the edge-emphasizing signal as a compensation signal corresponding to the target signal can obtain the edge-emphasized signal. More specifically, by adding the edge-emphasizing signal to a signal to be emphasized, the edge-emphasized signal can be obtained. Especially, the edge-emphasizing signal often has a delay that cannot be ignored with respect to the signal to which the edge-emphasizing signal is added. In such case, these signals can be added in correspondence with each other. That is, as will be described later in the following embodiment, an arrangement for delaying the target signal in correspondence with the timing of the edge-emphasizing signal corresponding to the target signal is preferably used.

The present invention can be applied not only to a case wherein the input or target signal is a function of time such as an analog video signal or serial digital video signal, but also to a signal which is not a function of time such as image data stored in a frame memory.

An edge emphasis device according to the third aspect of the present invention can be applied to a case wherein the input or target signal is not a function of time, and is an edge emphasis device for emphasizing an edge of a display image, characterized by comprising second derivative signal generation means for generating second derivative data as data obtained by subtracting, from an image data value of a target data in original image data before edge emphasis, an average value of an image data value of a lead pixel as a pixel which is located a predetermined distance before the target pixel in a vertical scan direction and/or horizontal scan direction, and an image data value of a lag pixel as a pixel which is separated a predetermined distance from the target pixel in a direction opposite to the direction, and edge-emphasizing data generation means for generating edge-emphasizing data by assigning a sign of the second derivative data to a minimum value of an absolute value of a difference between the image data values of the target pixel and the lead pixel, an absolute value of a difference between the image data values of the target pixel and the lag pixel, and an absolute value of the second derivative data.

The present invention includes, as its fourth aspect, an image forming apparatus which comprises the aforementioned edge emphasis device, and an image forming unit for forming an image on the basis of a signal, the edge of which is emphasized by that edge emphasis device. Note that the image forming unit can preferably use, e.g., a display for displaying an image.

The present invention also includes the following aspect as an image signal processing method. That is, an image signal processing method according to the fifth aspect of the present invention is characterized by comprising the steps of generating a second derivative signal as a signal obtained by subtracting, from a target signal, an average value of a lead signal that leads ahead of the target signal a predetermined time, and a lag signal that lags behind the target signal a predetermined time, and generating an edge-emphasizing signal by assigning a sign of the second derivative signal to a minimum value of an absolute value of a difference between the target signal and the lead signal, an absolute value of a difference between the target signal and the lag signal, and an absolute value of the second derivative signal. Especially, an edge-emphasized signal is preferably generated using the edge-emphasizing signal as a compensation signal corresponding to the target signal.

Furthermore, the present invention includes, as its sixth aspect, an image forming method characterized by forming an image on the basis of a signal obtained by the above image signal processing method.

Note that the "second derivative signal (or data)" means "a signal that represents the difference between the image signal amplitude (or image data value) of a given point (or pixel) and those of surrounding points (pixels)". Also, the "signal obtained by emphasizing the edge of the input signal" means a "signal that displays an image, the edge of which is emphasized compared to an image displayed based on the input signal".

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A to 6D are block diagrams showing the arrangements of an image forming apparatus according to a preferred embodiment of the present invention.

DETAILED DESCRIPTION OF THE PREFERRED EMBODIMENTS

Figure 1:
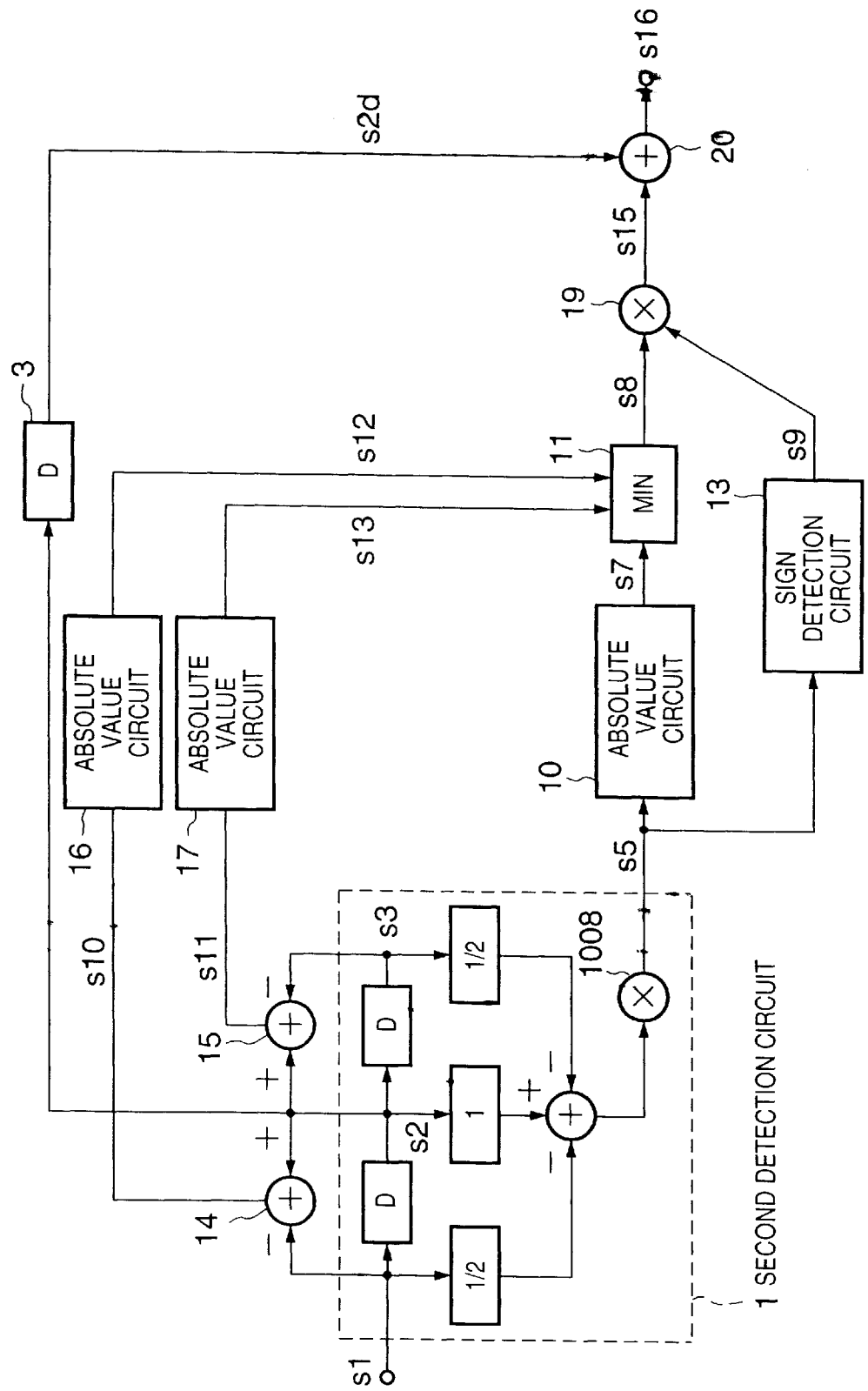
FIG. 1 is a circuit diagram showing the arrangement of an edge emphasis circuit according to an embodiment of the present invention.

In a preferred embodiment of the present invention, an edge emphasis device comprises: delay means for generating a second signal (s2) by delaying an input first signal (s1) a predetermined time; delay means for generating a third signal (s3) by further delaying the second signal the predetermined time; three multiplication means for respectively generating fourth, fifth, and sixth signals by respectively multiplying the first, second, and third signals by predetermined coefficients; computation means for outputting a seventh signal (s5) as a second derivative signal by computing the fourth, fifth, and sixth signals; means for outputting an eighth signal (s7) as an absolute value of the seventh signal; sign detection means for outputting a ninth signal (s9) by detecting the sign of the seventh signal; means for outputting a 10th signal (s12) as an absolute value of a difference between the first and second signals; means for outputting an 11th signal (s13) as an absolute value of a difference between the second and third signals; minimum value output means for outputting a 12th signal (s8) as a minimum value of the eight, 10th, and 11th signals by comparing these signals; means for outputting a 13th signal (s15) obtained by assigning the sign to the 12th signal on the basis of the ninth signal as the output from the sign detection means; and addition means (20) for adding the 13th signal and a signal obtained by delaying the second signal the predetermined time.

In a preferred second embodiment of the present invention, an edge emphasis device comprises: a second derivative signal generation circuit (1) for generating a second derivative signal (s5) as a signal obtained by subtracting, from a target signal, the average value of a lead signal (s1) that leads ahead of the target signal a predetermined time, and a lag signal (s3) that lags behind the target signal a predetermined time; and An edge-emphasizing signal generation circuit (10, 11, 13–17, 19) for generating an edge-emphasizing signal (s15) by assigning a sign of the second derivative signal to a minimum value (s8) of an absolute value (s12) of a difference between the target signal and lead signal, an absolute value (s13) of a difference between the target signal and lag signal, and an absolute value (s7) of the second derivative signal.

This embodiment demonstrates that the first to third delay circuits (means) used in the first embodiment can be omitted in some cases. More specifically, if three signals which are delayed a predetermined time each are obtained without using the first and second delay circuits, these circuits need not be equipped in the edge-emphasizing signal generation circuit. Also, if the delay time of the input signal matches that of the corresponding edge-emphasizing signal without using the third delay circuit (3), the third delay means can also be omitted.

According to the aforementioned embodiments of the present invention, since the magnitude of the edge-emphasizing signal is set to equal the minimum value of the absolute value of the second derivative and the absolute values of the differences between the second derivative and signals before and after that second derivative, and its sign is set to be the same as that of the second derivative signal, an edge portion of a stepwise input signal can be emphasized while suppressing overshoot or undershoot. Also, only pulse portions of a pulse input signal can be emphasized.

When the edge emphasis device of the present invention is combined with an image forming unit that forms an image on the basis of a signal, the edge of which is emphasized by that edge emphasis device, an image forming apparatus can be constructed.

FIGS. 6A to 6D show embodiments of such image forming apparatus. Referring to FIG. 6A, an edge emphasis device 100 receives an analog or digital video signal, and outputs a signal (s16) obtained by emphasizing the edge of the input signal to an image forming unit 200. The image forming unit 200 can comprise a frame memory as needed.

The edge emphasis device of the present invention can be arranged to be compatible to both the analog and digital signal inputs.

When an analog signal is processed by an edge emphasis device which is compatible to the digital signal input, the analog signal can be converted into a digital signal by an A/D converter.

Referring to FIG. 6B, an edge emphasis device 101 receives a digital video signal, and outputs a signal (s16) obtained by emphasizing the edge of the input signal to a frame memory 201. An image forming unit 202 displays an image on the basis of image data stored in the frame memory 201.

Figure 4:
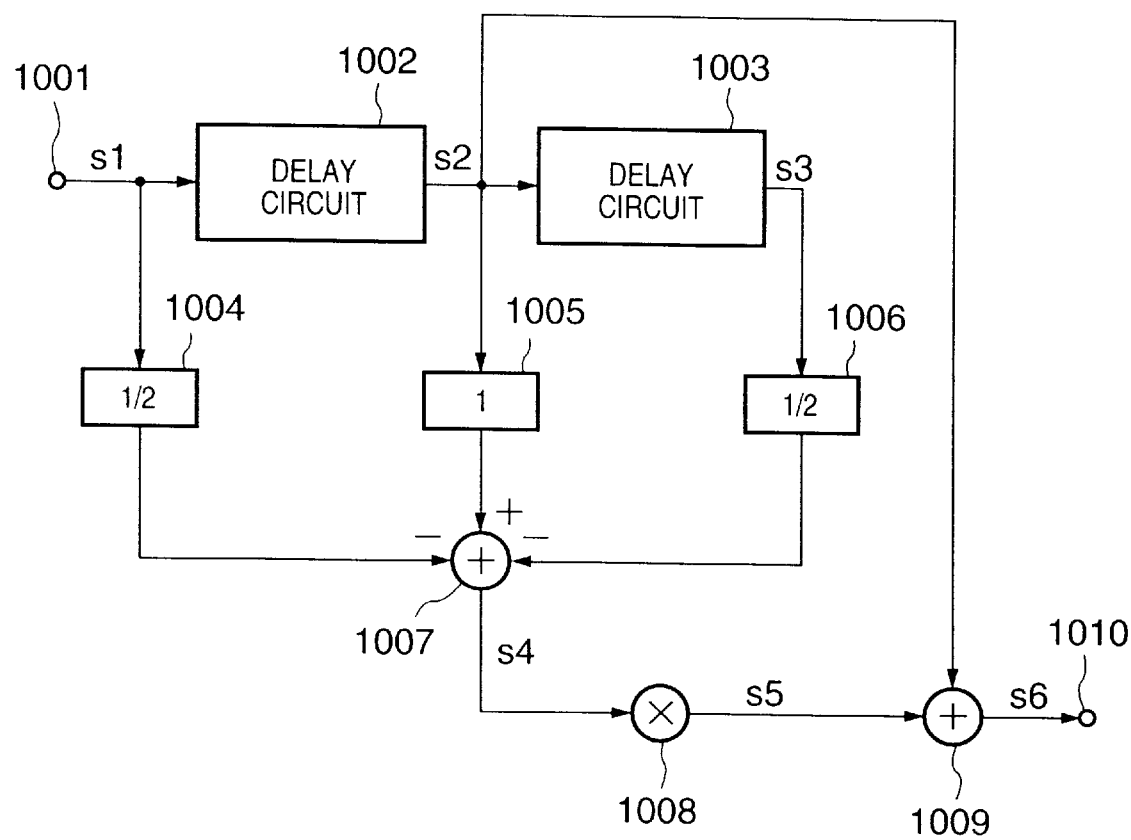
FIG. 4 is a circuit diagram of a conventional edge emphasis circuit.

Referring to FIG. 6C, an edge emphasis device 102 reads out lead data (s1) and lag data (s3) every time it reads out target data (s2) from image data stored in a frame memory 203, generates data (s16) obtained by emphasizing the edge of the target data (s2), and outputs that data to an image forming unit 204. In this embodiment, the edge emphasis device 102 does not require any delay means corresponding to delay circuits 1002 and 1003 shown in FIG. 4. In this case, the edge emphasis device 102 can emphasize the edge asynchronous to the display process by the image forming unit 204.

Referring to FIG. 6D, an edge emphasis device 103 reads out three successive data in a horizontal or vertical scan direction, or a predetermined direction perpendicular to such direction from image data stored in a frame memory 205 as lead data (s1), target data (s2), and lag data (s3), generates data obtained by emphasizing the edge of the target data (s2), and rewrites the target data in the frame memory 205 by the generated data. Upon completion of rewriting one target data, the device 103 uses the target data and lag data before rewrite, which have already been read out, as new lead data (s1) and target data (s2) respectively, reads out next data of the delay data before rewrite as new lag data (s3), and generates data obtained by emphasizing the edge of the new target data (s2). Likewise, the device 103 rewrites all image data in the frame memory 205. An image forming unit 206 displays an image on the basis of the image data stored in the frame memory 205.

Embodiment

Figure 5:
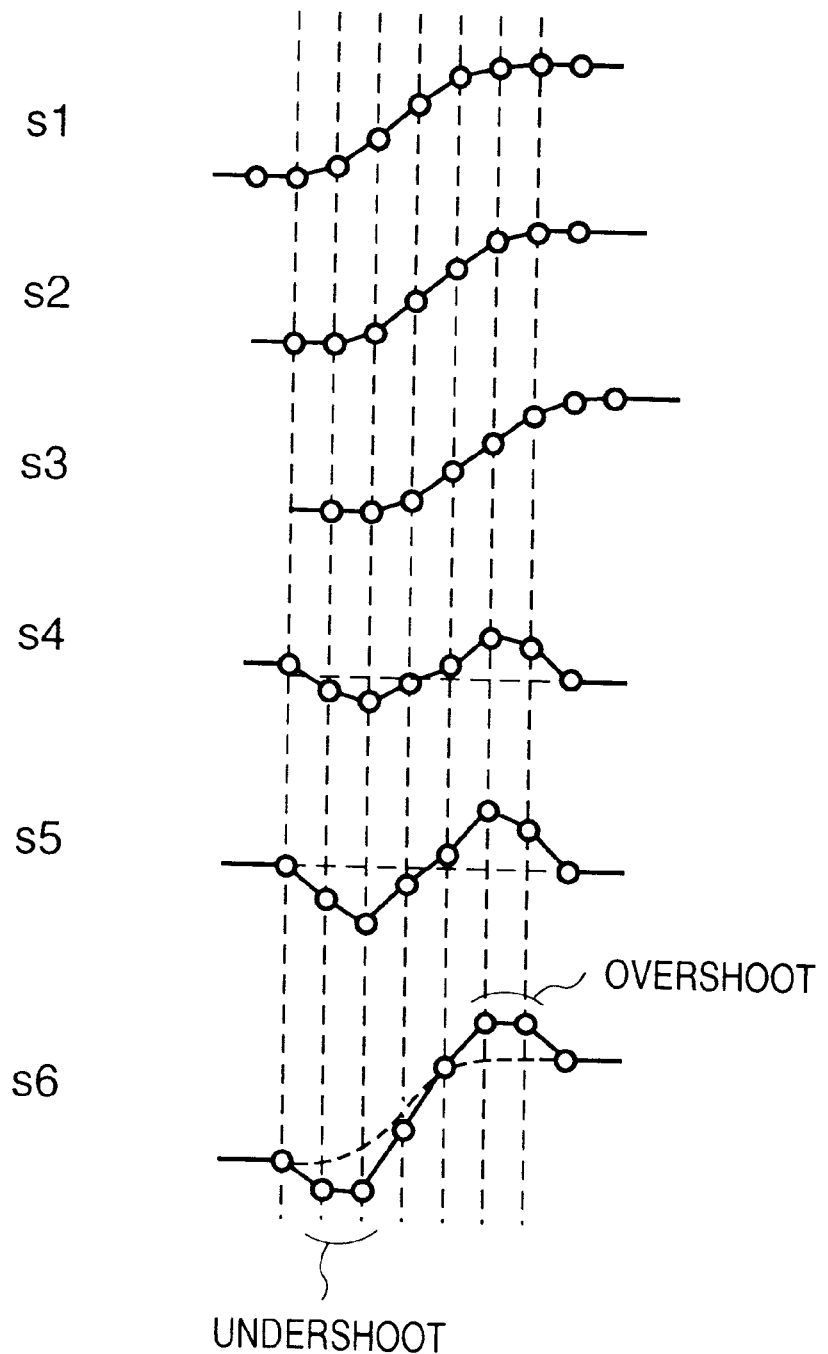
FIG. 5 is a chart showing processes of edge emphasis by the conventional edge emphasis circuit shown in FIG. 4.

FIG. 1 is a circuit diagram showing an edge emphasis circuit according to an embodiment of the present invention. This embodiment will be explained below with reference to FIG. 1. The arrangement of the device will be explained first. Referring to FIG. 1, reference numeral 1 denotes a second derivative signal generator, which is the same as that described in the prior art. An output signal from the second derivative signal generator 1 is a second derivative signal s5, as shown in FIG. 5. In the conventional circuit, this signal s5 is added to an original signal s2 asian edge-emphasizing signal. However, this embodiment suppresses overshoot or undershoot using the circuits to be described below.

Referring to FIG. 1, reference numeral 10 denotes an absolute value circuit for outputting an absolute value s7 of the signal s5; 14, an adder for computing a difference s10 between an input signal s1, and a signal s2 obtained by delaying the signal s1 one pixel; and 15, an adder for computing a difference s11 between the signal s2 and a signal s3 obtained by further delaying the signal s2 one pixel. That is, the signals s10 and s11 are difference signals between the pixel of interest and those before and after the pixel of interest. Reference numerals 16 and 17 denote circuits for computing absolute values s12 and s13 of the difference signals s10 and s11. Reference numeral 11 denotes a minimum value selection circuit for outputting, as a signal s8, a minimum value of three signals, i.e., the absolute value s7 of the second derivative signal s5, and the absolute values s12 and s13 of the difference signals s10 and s11. The signals s7, s12, and s13 are positive signals since they are output from the absolute value circuits. Hence, the signal s8 always assumes a positive value.

Reference numeral 13 denotes a circuit for detecting the sign of the second derivative signal s5. The sign detection circuit 13 outputs a signal s9, which assumes, e.g., "1" if the second derivative signal s5 is equal to or larger than "0", or "−1" if the signal s5 is negative. Reference numeral 19 denotes a multiplier for multiplying the signals s8 and s9. An output signal s15 from the multiplier 19 serves as an edge-emphasizing signal. To restate, the signal s8 always assumes a positive value. Hence, the sign of the edge-emphasizing signal s15 matches that of the signal s9, i.e., that of the second derivative signal s5.

The signal s2 obtained by delaying the input signal s2 one pixel is delayed a predetermined time by a delay circuit 3, and the delayed signal is added to the edge-emphasizing signal s15 by an adder 20. The delay circuit 3 compensates for the time required for generating the edge-emphasizing signal s15.

Figure 2:
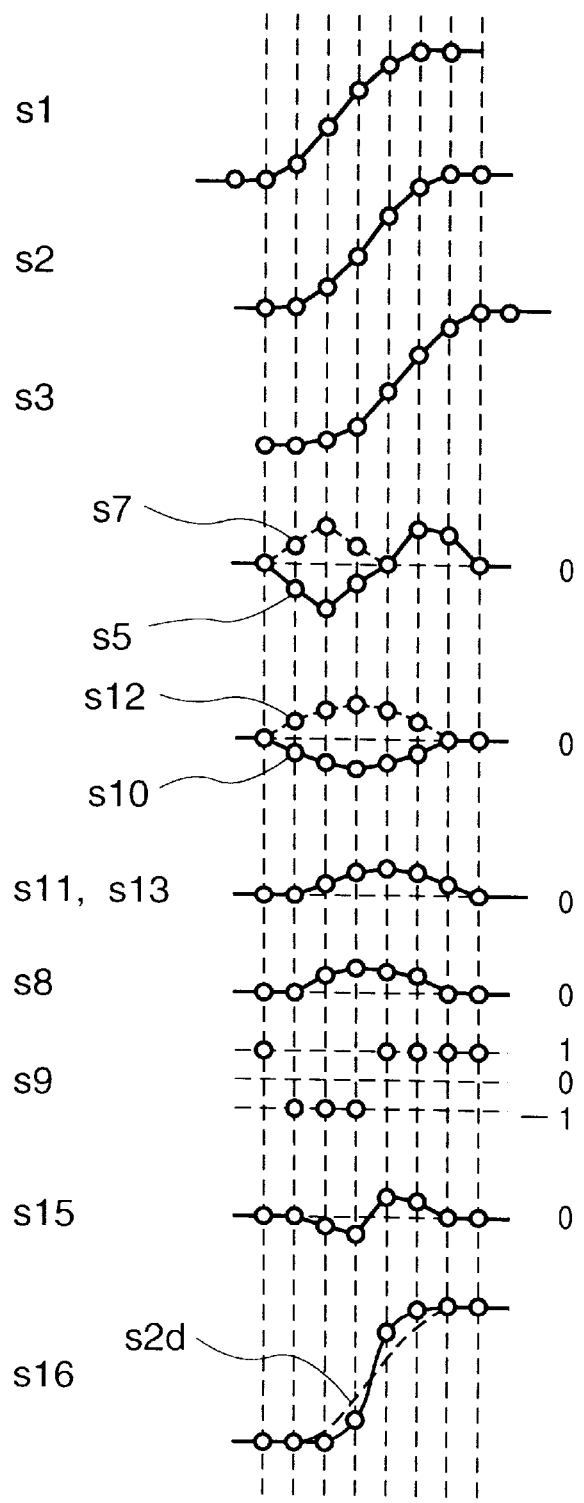
FIG. 2 is a chart for explaining signal processing in the circuit shown in FIG. 1.

The processing in this circuit will be explained below. FIG. 2 shows processes until the edge-emphasizing signal s15 is added to a stepwise original signal in this circuit. As shown in FIG. 2, a second derivative signal s5 is generated based on an input video signal sl, a signal s2 obtained by delaying the signal s1 one pixel, and a signal s3 obtained by further delaying the signal s2 one pixel. This process is the same as that in the prior art shown in FIG. 5.

The second derivative signal s5 branches to the absolute value circuit 10 and sign detection circuit 13. One second derivative signal s5 is converted into a signal s7, the negative portion of which is inverted by the absolute value circuit 10. The other second derivative signal s5 is input to the sign detection circuit 13, which outputs an output signal s9 which assumes "1" if the second derivative signal s5 is equal to or larger than "0", or "−1" if it is negative. The signal s9 is input to the multiplier 19, and is used to determine the sign of an edge-emphasizing signal. The multiplier 19 multiplies a positive signal s8 by the signal s9 which is either "1" or "−1". For this reason, the sign of an edge-emphasizing signal s15 as the product matches that of the signal s9. Therefore, the signal s9 determines the sign of the edge-emphasizing signal s15. That is, in the present invention, the sign of the edge-emphasizing signal is always consistent with that of the second derivative signal.

The adders 14 and 15 respectively output the difference (s2−s1) between the signals s1 and s2 as a signal s10, and the difference (s2−s3) between the signals s2 and s3 as a signal s11. The signals s10 and s11 have waveforms, as shown in FIG. 2. The absolute values of the signals s10 and s11 are computed by the absolute value circuits 16 and 17, and are output as signals s12 and s13. In the example shown in FIG. 2, the signal s10 is different from the signal s12 since it has a negative portion, but the signals s11 and s13 are the same signals.

The minimum value selection circuit 11 outputs a minimum one of the signals s7, s12, and s13. That is, the circuit 11 outputs a minimum one of a total of three signals, i.e., the absolute value s7 of the second derivative, and two absolute values s12 and s13 of the differences between the second derivative and the signals before and after the second derivative. The output signal s8 always assumes a positive value, as shown in FIG. 2.

The multiplier 19 multiplies the signal s8 and the signal s9 that indicates the sign of the second derivative signal to obtain the edge-emphasizing signal s15. That is, the edge-emphasizing signal according to the present invention has a magnitude which is equal to a minimum value of the absolute value of the second derivative, and the absolute values of the differences between the second derivative and the signals before and after the second derivative, and a sign which is the same as that of the second derivative. Therefore, when the original signal s1 is as shown in FIG. 2, the edge of the pixel of interest is never emphasized beyond values before and after the pixel of interest, thus preventing overshoot/undershoot.

When the adder 20 adds the edge-emphasizing signal s15 and a signal obtained by appropriately delaying the signal s2, an edge-emphasized image signal s16 free from any overshoot/undershoot can be obtained. FIG. 2 indicates the original signal by the dotted curve to overlap the signal s16.

Figure 3:
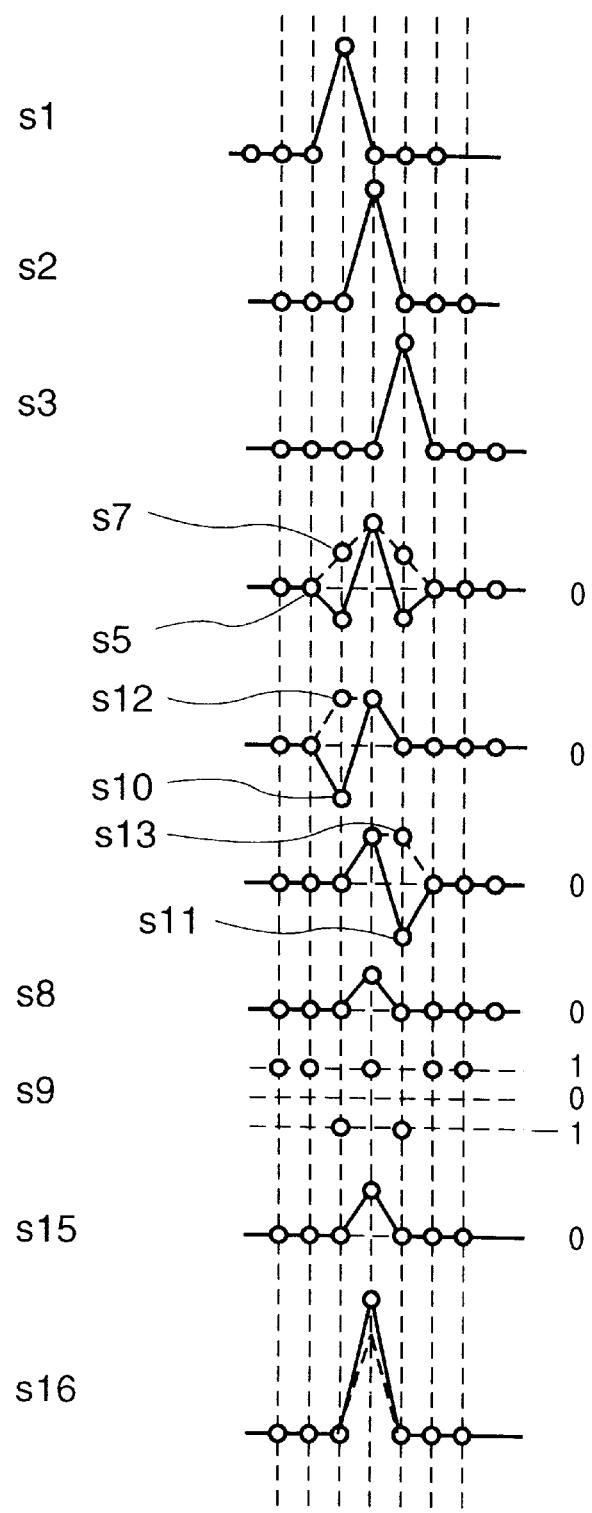
FIG. 3 is a chart for explaining another signal processing in the circuit shown in FIG. 1.

FIG. 3 shows processes upon edge-emphasizing a pulse signal. As in the aforementioned processes, a second derivative signal s5 is generated based on an input video signal s1, a signal s2 obtained by delaying the signal s1 one pixel, and a signal s3 obtained by further delaying the signal s2 one pixel. The second derivative signal s5 branches. One signal is converted into a signal s7, the negative portion of which is inverted by the absolute value circuit 10. The other second derivative signal s5 is input to the sign detection circuit 13, which outputs an output signal s9 which assumes "1" if the second derivative signal s5 is equal to or larger than "0", or "−1" if it is negative.

The adders 14 and 15 respectively output the difference (s2−s1) between the signals s1 and s2 as a signal s10, and the difference (s2−s3) between the signals s2 and s3 as a signal s11. The signals s10 and s11 have waveforms, as shown in FIG. 3. The absolute values of the signals s10 and s11 are computed by the absolute value circuits 16 and 17, and are output as signals s12 and s13.

The minimum value selection circuit 11 outputs a minimum one of the signals s7, s12, and s13. That is, the circuit 11 outputs a minimum one of a total of three signals, i.e., the absolute value of the second derivative, and two absolute values of the differences between the second derivative and the signals before and after the second derivative. The output signal s8 has a waveform, as shown in FIG. 3.

The multiplier 19 multiplies the signal s8 and the signal s9 that indicates the sign of the second derivative signal to obtain the edge-emphasizing signal s15. When the adder 20 adds the edge-emphasizing signal s15 and a signal obtained by appropriately delaying the signal s2, an edge-emphasized image signal s16 can be obtained. FIG. 3 indicates the original signal by the dotted curve to overlap the signal s16.

As described above, according to this embodiment, a stepwise signal can undergo edge emphasis free from any overshoot or undershoot, and a pulse signal can undergo edge emphasis that emphasizes only pulse portions.

According to the present invention, upon emphasizing the edge of an image, deterioration of image quality can be prevented by suppressing overshoot or undershoot of a compensation signal or data while maintaining the improvement effect of the leading edge of an edge portion.

As many apparently widely different embodiments of the present invention can be made without departing from the spirit and scope thereof, it is to be understood that the invention is not limited to the specific embodiments thereof except as defined in the appended claims.

What is claimed is:

1. An edge emphasis device which comprises first delay means for delaying an input signal a predetermined time, second delay means for further delaying an output signal from said first delay means a predetermined time, and second derivative signal generation means for outputting a second derivative signal of the input signal on the basis of the input signal and the output signals from said first and second delay means, comprising:

edge-emphasizing signal generation means for generating an edge-emphasizing signal by assigning a sign of the second derivative signal to a minimum absolute value of a difference between the input signal and the output signal from said first delay means, a difference between the output signals from said first and second delay means, and the second derivative signal; and delay addition means for outputting a signal obtained by emphasizing an edge of the input signal by adding the input signal and a corresponding edge-emphasizing signal in correspondence with each other.

2. The device according to claim 1, wherein said second derivative signal generation means comprises three multiplication means for respectively multiplying the input signal and the output signals from said first and second delay means by predetermined coefficients, and computation means for outputting the second derivative signal by computing output signals from said three multiplication means.

3. The device according to claim 1, wherein said edge-emphasizing signal generation means comprises sign detection means for detecting and outputting a sign of the second derivative signal, three absolute value signal output means for respectively outputting absolute values of the difference between the input signal and the output signal from said first delay means, the difference between the output signals from said first and second delay means, and the second derivative signal, minimum value output means for outputting a minimum one of output signals from said three absolute value signal output means, and multiplication means for outputting the edge-emphasizing signal by assigning the sign detected by said sign detection means to an output signal from said minimum value signal output means.

4. The device according to claim 1, wherein said delay addition means comprises third delay means for delaying the output signal from said first delay means a predetermined time, and addition means for outputting a signal obtained by emphasizing an edge of the input signal by adding an output signal from said third delay means and the edge-emphasizing signal.

5. An edge emphasis device for emphasizing an edge of an image signal, comprising:

a second derivative signal generation circuit for outputting a second derivative signal of a target signal on the basis of a target signal, a lead signal that leads ahead of the target signal a predetermined time, and a lag signal that lags behind the target signal a predetermined time; and an edge-emphasizing signal generation circuit for generating an edge-emphasizing signal by assigning a sign of the second derivative signal to a minimum value of an absolute value of a difference between the target signal and the lead signal, an absolute value of a difference between the target signal and the lag signal, and an absolute value of the second derivative signal.

6. The device according to claim 5, wherein the second derivative signal is obtained by subtracting an average value of the lead and lag signals from the target signal.

7. The device according to claim 5, further comprising means for generating an edge-emphasized signal using the edge-emphasizing signal as a compensation signal corresponding to the target signal.

8. An edge emphasis device for emphasizing an edge of a display image, comprising:

second derivative signal generation means for generating second derivative data as data obtained by subtracting, from an image data value of a target pixel in original image data before edge emphasis, an average value of an image data value of a lead pixel as a pixel which is located a predetermined distance before the target pixel in a vertical scan direction and/or horizontal scan direction, and an image data value of a lag pixel as a pixel which is separated a predetermined distance from the target pixel in a direction opposite to the direction; and edge-emphasizing data generation means for generating edge-emphasizing data by assigning a sign of the second derivative data to a minimum value of an absolute value of a difference between the image data values of the target pixel and the lead pixel, an absolute value of a difference between the image data values of the target pixel and the lag pixel, and an absolute value of the second derivative data.

9. The device according to claim 8, wherein the lead and lag pixels are a pair of neighboring pixels that sandwich the display pixel therebetween in an up-and-down, right-and-left, or oblique direction.

10. An image forming apparatus comprising an edge emphasis device of claim 1, and an image forming unit for forming an image on the basis of an image signal or image data, an edge of which is emphasized by said edge emphasis device.

11. The apparatus according to claim 10, wherein said image forming unit is a display for displaying an image.

12. An image processing method comprising the steps of:

generating a second derivative signal as a signal obtained by subtracting, from a target signal, an average value of a lead signal that leads ahead of the target signal a predetermined time, and a lag signal that lags behind the target signal a predetermined time; and generating an edge-emphasizing signal by assigning a sign of the second derivative signal to a minimum value of an absolute value of a difference between the target signal and the lead signal, an absolute value of a difference between the target signal and the lag signal, and an absolute value of the second derivative signal.

13. The method according to claim 12, further comprising the step of generating an edge-emphasized signal using the edge-emphasizing signal as a compensation signal corresponding to the target signal.

14. An image forming method for forming an image on the basis of a signal obtained by an image signal processing method of claim 12.

* * * * *

UNITED STATES PATENT AND TRADEMARK OFFICE
CERTIFICATE OF CORRECTION

PATENT NO.     : 6,278,494 B1
DATED          : August 21, 2001
INVENTOR(S)    : Izumi Kanai et al.

It is certified that error appears in the above-identified patent and that said Letters Patent is hereby corrected as shown below:

<u>Title page,</u>
Item [75], Inventors, "Yukio Masuda," should read -- Yukio Hiraki, --.

<u>Column 1,</u>
Line 28, "numerals sl" should read -- numerals s1 --;
Line 31, "signal sl" should read -- signals s1 --;
Lines 43 and 44, "signals sl" should read -- signals s1 --; and
Lines 38 and 41, "signals sl," should read -- signals s1, --;

<u>Column 4,</u>
Line 61, "eight," should read -- eighth --.

<u>Column 5,</u>
Line 8, close up right margin;
Line 9, "An" should read -- an --; and
Line 16, close up right margin.

<u>Column 6,</u>
Line 16, "data (sl)" should read -- data (s1) --;
Line 33, "asian" should read -- as an --;
Line 43, "sll" should read -- s11 --;
Line 59, "numeral .19" should read -- numeral 19 --; and
Line 66, "signal s2" (first occurrence) should read -- signal s3 --.

<u>Column 7,</u>
Line 9, "signal sl," should read -- signal s1, --.

<u>Column 9,</u>
Line 31, "a target" should read -- the target --.

UNITED STATES PATENT AND TRADEMARK OFFICE
CERTIFICATE OF CORRECTION

PATENT NO. : 6,278,494 B1
DATED : August 21, 2001
INVENTOR(S) : Izumi Kanai et al.

It is certified that error appears in the above-identified patent and that said Letters Patent is hereby corrected as shown below:

Column 10,
Line 9, "direction;" should read -- direction of the lead pixel; --;
Line 23, "an" should read -- the --; and
Line 47, "an image signal" should read -- the image --.

Signed and Sealed this

Tenth Day of August, 2004

JON W. DUDAS
*Acting Director of the United States Patent and Trademark Office*